(12) United States Patent
Yoo et al.

(10) Patent No.: US 10,374,231 B2
(45) Date of Patent: *Aug. 6, 2019

(54) LITHIUM SECONDARY BATTERY

(71) Applicant: SK Innovation Co., Ltd., Seoul (KR)

(72) Inventors: Kyung-Bin Yoo, Daejeon (KR); Kook-Hyun Han, Daejeon (KR); Duck-Chul Hwang, Suwon-si (KR)

(73) Assignee: SK Innovation Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/967,845

(22) Filed: Dec. 14, 2015

(65) Prior Publication Data
US 2016/0172671 A1    Jun. 16, 2016

(30) Foreign Application Priority Data
Dec. 16, 2014 (KR) .......................... 10-2014-0181644

(51) Int. Cl.
| | |
|---|---|
| *H01M 4/485* | (2010.01) |
| *H01M 4/525* | (2010.01) |
| *H01M 4/505* | (2010.01) |
| *H01M 4/36* | (2006.01) |
| *C01G 53/00* | (2006.01) |
| *H01M 10/052* | (2010.01) |

(52) U.S. Cl.
CPC ............ *H01M 4/485* (2013.01); *C01G 53/42* (2013.01); *C01G 53/50* (2013.01); *H01M 4/364* (2013.01); *H01M 4/505* (2013.01); *H01M 4/525* (2013.01); *C01P 2002/52* (2013.01); *C01P 2002/54* (2013.01); *C01P 2004/03* (2013.01); *C01P 2004/61* (2013.01); *C01P 2006/40* (2013.01); *H01M 4/362* (2013.01); *H01M 10/052* (2013.01)

(58) Field of Classification Search
CPC ........... H01M 10/052; H01M 10/0525; H01M 4/131; H01M 4/485; H01M 4/505; H01M 4/525; H01M 4/1391
See application file for complete search history.

(56) References Cited

U.S. PATENT DOCUMENTS

| | | | |
|---|---|---|---|
| 2007/0254209 A1 | 11/2007 | Baba et al. | |
| 2009/0068561 A1* | 3/2009 | Sun ...................... | H01M 4/131 429/223 |
| 2010/0015514 A1 | 1/2010 | Miyagi et al. | |

(Continued)

FOREIGN PATENT DOCUMENTS

| | | |
|---|---|---|
| KR | 1020060134631 A | 12/2006 |
| KR | 1020140118517 A | 10/2014 |

(Continued)

*Primary Examiner* — Jimmy Vo
(74) *Attorney, Agent, or Firm* — IP & T Group LLP

(57) ABSTRACT

The present invention relates to a lithium secondary battery, and more specifically, to a lithium secondary battery including a cathode, an anode and a non-aqueous electrolyte solution, where the cathode includes a cathode active material including a lithium-metal oxide which is doped with a transition metal and includes at least one type of metal having a concentration gradient region between a central portion and a surface portion, and thus having a significantly increased charge/discharge capacity and output at a low temperature to exhibit excellent properties in the low-temperature environment.

12 Claims, 4 Drawing Sheets

(56) References Cited

U.S. PATENT DOCUMENTS

| | | | |
|---|---|---|---|
| 2011/0052980 A1 | 3/2011 | Sakata et al. | |
| 2013/0260231 A1* | 10/2013 | Hua | H01M 4/364 429/211 |
| 2014/0027670 A1* | 1/2014 | Sun | H01M 4/483 252/182.1 |
| 2014/0087266 A1* | 3/2014 | Li | H01M 4/485 429/231.3 |
| 2014/0158932 A1* | 6/2014 | Sun | H01M 4/13 252/182.1 |

FOREIGN PATENT DOCUMENTS

| | | | |
|---|---|---|---|
| WO | 2012093797 A2 | 7/2012 | |
| WO | WO-2012093797 A2 * | 7/2012 | H01M 4/364 |
| WO | WO 2013183974 A1 * | 12/2013 | H01M 4/13 |

\* cited by examiner

LITHIUM SECONDARY BATTERY

CROSS-REFERENCE TO RELATED APPLICATION

This application claims priority to Korean Patent Application No. 2014-0181644 filed Dec. 16, 2014, the disclosure of which is hereby incorporated in its entirety by reference.

BACKGROUND

1. Field of the Invention

The present invention relates to a lithium secondary battery, and more specifically, to a lithium secondary battery having excellent low-temperature properties.

2. Discussion of Related Art

With the rapid development of the electronics, communications and computer industries, portable electronics and communication devices such as camcorders, mobile phones, notebook PCs or the like have remarkably developed. Accordingly, there is an increasing demand for a lithium secondary battery as a power source which may drive the devices. Particularly, research and development on the lithium secondary battery as an environmentally friendly power source in the field of applications of electric automobiles, uninterruptible power supplies, machine tools, artificial satellites or the like have been actively conducted in Korea, Japan, Europe and the U.S.A.

In secondary batteries which are being recently applied, a lithium secondary battery developed in the early 1990s includes: an anode such as a carbon material or the like which may intercalate or deintercalate lithium ions; a cathode formed of a lithium-containing oxide or the like; and a non-aqueous electrolyte solution prepared by dissolving a suitable amount of a lithium salt in a mixed organic solvent.

As the application range of the lithium secondary battery is expanded, the lithium secondary battery is used as a power source of electric automobiles or the like, and in such a case, performance allowing automobiles to be operated in a harsh environment such as higher temperatures or lower temperatures than that in mobile phones, notebook PCs or the like is required. Since automobiles should be operated at a low temperature such as in winter, excellent charge/discharge performance and output properties at a low temperature are typically required.

However, a low temperature environment results in severe problems of reduced charge/discharge performance and output properties due to a decrease in an electrochemical reaction rate, and thus there is a need of the development of a technique for a lithium secondary battery having excellent low-temperature properties.

Korean Laid-open Patent Publication No. 2014-118517 discloses a non-aqueous electrolyte solution additive for a lithium secondary battery.

PRIOR ART

Patent document: Korean Laid-open Patent Publication No. 2014-118517

SUMMARY OF THE INVENTION

The present invention is directed to providing a lithium secondary battery with significantly improved low-temperature properties.

According to an aspect of the present invention, there is provided a lithium secondary battery, including: a cathode; an anode; and a non-aqueous electrolyte solution, where the cathode includes a cathode active material including a lithium-metal oxide which is doped with a transition metal and includes at least one type of metal having a concentration gradient region between a central portion and a surface portion.

The transition metal may be at least one selected from the group consisting of Ti, Zr, Mg, Al, V, B, Na, Ca, Cr, Cu, Zn, Ge, Sr, Ba, Nb and Ga.

A concentration of the transition metal as a dopant ranges from 500 to 7,000 ppm.

A concentration of the transition metal as a dopant ranges from 500 to 3,000 ppm.

The lithium-metal oxide may further include Al, Ti, Ba, Zr, Si, B, Mg, P, alloys thereof or a coating layer of oxides thereof at a surface of the lithium-metal oxide.

Another type of metal in metals forming the lithium-metal oxide may have a uniform concentration between the central portion and the surface portion.

The lithium-metal oxide may include: a first metal, having a concentration gradient region in which a concentration increases between the central portion and the surface portion; and a second metal, having a concentration gradient region in which a concentration decreases between the central portion and the surface portion.

The lithium-metal oxide may be represented by the following Formula 1, and at least one of M1, M2 and M3 may have a concentration gradient region between a central portion and a surface portion in the following Formula 1:

$$Li_xM1_aM2_bM3_cO_y \qquad \text{[Formula 1]}$$

(where M1, M2 and M3 are selected from the group consisting of Ni, Co, Mn, Na, Mg, Ca, Ti, V, Cr, Cu, Zn, Ge, Sr, Ag, Ba, Zr, Nb, Mo, Al, Ga and B, and $0<x\leq1.1$, $2\leq y\leq2.02$, $0\leq a\leq1$, $0\leq b\leq1$, $0\leq c\leq1$, $0<a+b+c\leq1$).

At least one of the M1, M2 and M3 may have a concentration gradient region in which a concentration increases between the central portion and the surface portion, and the remainder may have a concentration gradient region in which a concentration decreases between the central portion and the surface portion.

One of the M1, M2 and M3 may have a concentration gradient region in which a concentration increases between the central portion and the surface portion, another one may have a concentration gradient region in which a concentration decreases between the central portion and the surface portion, and the other may have a uniform concentration between the central portion and the surface portion.

The M1, M2 and M3 may be Ni, Co and Mn, respectively.

The M1 may be Ni, and $0.6\leq a\leq0.95$ and $0.05\leq b+c\leq0.4$.

The M1 may be Ni, and $0.7\leq a\leq0.9$ and $0.1\leq b+c\leq0.3$.

Primary particles including the lithium-metal oxide may be rod-type particles.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
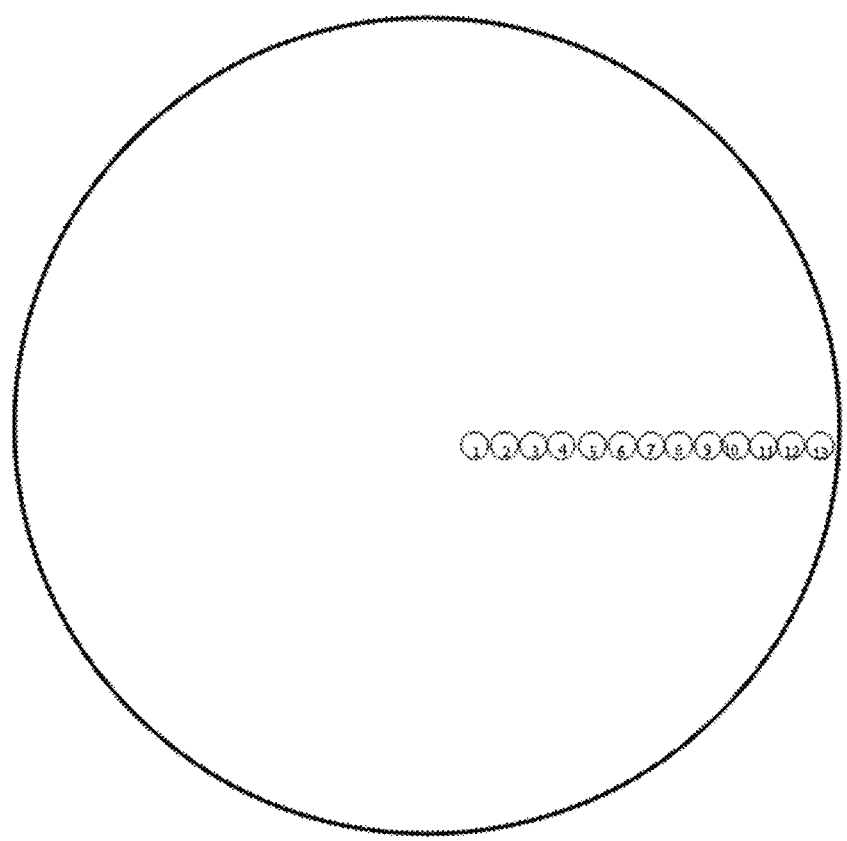
FIG. 1 is a view schematically illustrating a position to measure the concentration of metal elements forming a lithium-metal oxide according to an embodiment of the present invention.

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

The present invention relates to a lithium secondary battery including a cathode, an anode and a non-aqueous electrolyte solution, where the cathode includes a cathode active material including a lithium-metal oxide which is doped with a transition metal and includes at least one type of metal having a concentration gradient region between a central portion and a surface portion, and thus having a significantly increased charge/discharge capacity and output at a low temperature to exhibit excellent properties in the low-temperature environment.

Hereinafter, the present invention will be described in detail.

Cathode Active Material

A cathode active material according to the present invention includes a lithium-metal oxide in which at least one type of metal has a concentration gradient between a central portion and a surface portion. This cathode active material has excellent lifespan properties as compared to a cathode active material with no change in concentration.

In the present invention, a lithium-metal oxide in which a metal has a concentration gradient region between a central portion and a surface portion denotes that metals except for lithium have a concentration distribution region in which a concentration changes with a constant tendency between the central portion and surface portion of lithium-metal oxide particles. The concentration distribution region (i.e., concentration gradient region) may be positioned without limitation insofar as the concentration distribution region is present between the central portion and the surface portion. The constant tendency denotes that a concentration has a decreasing or increasing tendency, but it does not exclude the case in which a value of concentration having a reverse tendency is shown at a portion.

In the present invention, the central portion of the particle refers to a portion within a radius of 0.1 μm from the center of active material particle, and the surface portion of the particle refers to a portion within 0.1 μm from the outermost portion of the particle.

The cathode active material according to the present invention includes at least one type of metal having a concentration gradient. Accordingly, as an example, a first metal having a concentration gradient region in which a concentration increases between the central portion and surface portion and a second metal having a concentration gradient region in which a concentration decreases between the central portion and surface portion may be included. The first metal or second metal, independently of each other, may include one or more types of metal.

As another example of the present invention, the cathode active material according to the present invention may include a metal having a uniform concentration between the central portion and surface portion.

A specific example of the cathode active material according to the present invention may include a lithium-metal oxide represented by the following Formula 1, and at least one of M1, M2 and M3 has a concentration gradient region between a central portion and a surface portion in the following Formula 1:

   [Formula 1]

(where M1, M2 and M3 are selected from the group consisting of Ni, Co, Mn, Na, Mg, Ca, Ti, V, Cr, Cu, Zn, Ge, Sr, Ag, Ba, Zr, Nb, Mo, Al, Ga and B, and $0<x\le1.1$, $2\le y\le2.02$, $0\le a\le1$, $0\le b\le1$, $0\le c\le1$, $0<a+b+c\le1$).

In an example of the present invention, at least one of the M1, M2 and M3 may have a concentration gradient region in which a concentration increases between a central portion and a surface portion, and the remainder may have a concentration gradient region in which a concentration decreases between a central portion and a surface portion.

In another example of the present invention, one of the M1, M2 and M3 may have a concentration gradient region in which a concentration increases between a central portion and a surface portion, another one may have a concentration gradient region in which a concentration decreases between a central portion and a surface portion, and the other may have a uniform concentration at a central portion to a surface portion.

As a specific example of the present invention, the M1, M2 and M3 may be Ni, Co and Mn, respectively.

The lithium-metal oxide according to the present invention may include a relatively high content of nickel (Ni). The use of nickel may be advantageous in improving battery capacity, and the cathode active material with a high content of nickel according to the present invention has no decrease in lifespan properties while the structure of the existing cathode active material with a high content of nickel has a problem of decreased lifespan. Accordingly, the cathode active material of the present invention may show excellent lifespan properties while maintaining a high capacity.

For example, the molar ratio of nickel may range from 0.6 to 0.95, preferably, from 0.7 to 0.9 in the lithium-metal oxide according to the present invention. That is, when M1 is Ni in Formula 1, $0.6\le a\le0.95$ and $0.05\le b+c\le0.4$, and preferably, $0.7\le a\le0.9$ and $0.1\le b+c\le0.3$.

A shape of particles of the lithium-metal oxide according to the present invention is not particularly limited, and preferably, primary particles thereof may be rod-type particles.

A size of particles of the lithium-metal oxide according to the present invention is not particularly limited, and for example, may be in the range of 3 to 25 μm.

Further, the lithium-metal oxide is doped with a transition metal.

A lithium secondary battery of the present invention includes a lithium-metal oxide as a cathode active material, and a metal in the lithium-metal oxide has a concentration gradient region between a central portion and surface portion, and the lithium-metal oxide is doped with a transition metal, and thus the lithium secondary battery may exhibit significantly improved low-temperature properties as described above.

For example, the transition metal may be at least one selected from the group consisting of Ti, Zr, Mg, Al, V, B, Na, Ca, Cr, Cu, Zn, Ge, Sr, Ba, Nb and Ga.

A doping amount of the transition metal is not particularly limited, and for example, a concentration of the transition metal as a dopant ranges from 500 to 7,000 ppm. When the concentration is less than 500 ppm, the effect of improving low-temperature properties may be low, and when the concentration is more than 7,000 ppm, the effect of improving low-temperature properties may also be decreased. A preferable concentration of the transition metal as a dopant ranges from 500 to 3,000 ppm in terms of maximizing the effect of improving low-temperature properties.

As necessary, the cathode active material according to the present invention may further include a coating layer on the above-described lithium-metal oxide. The coating layer may include a metal or a metal oxide, for example, may include Al, Ti, Ba, Zr, Si, B, Mg, P or alloys thereof, or may include metal oxides thereof.

The lithium-metal oxide according to the present invention may be prepared using a coprecipitation method.

Hereinafter, an example of a method of preparing the cathode active material according to the present invention will be described.

First, a metal salt solution for forming a central portion and a metal salt solution for forming a surface portion are prepared. Next, the metal salt solution for forming a central portion and the metal salt solution for forming a surface portion are mixed according to a desired concentration gradient, while being mixed with a chelating agent and an basic aqueous solution in a reactor, thereby preparing a precipitate having a concentration gradient region of one or more metal elements between a central portion and a surface portion.

A solution of transition metal for doping is also mixed during the mixing process. For example, a transition metal solution may be a sulfate solution, but is not limited thereto.

The prepared precipitate is heat-treated, mixed with a lithium salt, and heat-treated again, and thereby the cathode active material according to the present invention may be obtained.

Anode Active Material

As an anode active material according to the present invention, the anode active material which is well-known in the related field and may intercalate and deintercalate lithium ions may be used without limitation. For example, a carbon material such as a crystalline carbon, an amorphous carbon, a carbon composite, a carbon fiber or the like, a lithium metal, alloys of lithium and other elements, silicon, tin or the like may be used. Examples of the amorphous carbon include hard carbon, coke, mesocarbon microbead (MCMB) calcinated below 1,500° C., mesophase pitch-based carbon fiber (MPCF), etc. Examples of the crystalline carbon include graphite materials, more specifically, natural graphite, graphitized coke, graphitized MCMB, and graphitized MPCF, etc. Examples of the other elements forming an alloy with lithium include aluminum, zinc, bismuth, cadmium, antimony, silicon, lead, tin, gallium or indium.

Secondary Battery

The present invention provides a lithium secondary battery prepared using the above-described cathode active material and anode active material according to the present invention.

The lithium secondary battery according to the present invention may be prepared to include a cathode, an anode, and a non-aqueous electrolyte solution.

The cathode and anode may be respectively prepared by mixing the above-described cathode active material and anode active material according to the present invention with a solvent, a binder, a conductive material, a dispersant as necessary with stirring to prepare a slurry, coating a metal current collector with the slurry, and performing drying and pressing thereon.

Any binder commonly used in the related field may be used as the binder, and for example, an organic binder such as a Polyvinylidene fluoride-hexafluoropropylene copolymer (PVDF-co-HFP), polyvinylidenefluoride (PVDF), polyacrylonitrile, polymethylmethacrylate or the like, or a water-based binder such as styrene-butadiene rubber (SBR) may be used with a thickener such as carboxymethyl cellulose (CMC).

A general conductive carbon material may be used as the conductive material without limitation.

Any metal may be used as the metal current collector insofar as the metal is highly conductive, is capable of being easily bonded with the slurry of the cathode or anode active material, and is not reactive in the voltage range of the battery. Non-limiting examples of a cathode current collector include foils prepared from aluminum, nickel or a combination thereof, and non-limiting examples of an anode current collector include foils prepared from copper, gold, nickel, aluminum alloys, or combinations thereof.

A separator is interposed between the cathode and anode, and a commonly-used porous polymer film, for example, one or a laminate of porous polymer films prepared using a polyolefin-based polymer such as an ethylene homopolymer, a propylene homopolymer, an ethylene-butene copolymer, an ethylene-hexene copolymer, an ethylene-methacrylate copolymer may be used as the separator, or a commonly-used porous nonwoven, for example, nonwovens prepared using a glass fiber with a high melting point, a polyethylene terephthalate fiber or the like may be used as the separator, but the present invention is not limited thereto. Examples of a method of applying the separator to the battery include a commonly-used winding, a lamination or stacking of the separator and electrodes, folding, etc.

A non-aqueous electrolyte solution includes a lithium salt which is an electrolyte and an organic solvent. Any lithium salt which is commonly used in an electrolyte solution for a secondary battery may be used as the lithium salt, and as the organic solvent, representatively, one or a mixture of two or more selected from the group consisting of propylene carbonate (PC), ethylene carbonate (EC), diethyl carbonate (DEC), dimethyl carbonate (DMC), ethyl methyl carbonate (EMC), methyl propyl carbonate, dipropyl carbonate, ethyl propionate, ethyl acetate, propyl acetate, dimethyl sulfur oxide, acetonitrile, dimethoxyethane, diethoxyethane, sulfolane, gamma-butyrolactone and tetrahydrofuran may be used.

The non-aqueous electrolyte solution, as necessary, may further include additives well-known in the related field without limitation, and for example, may include at least one of vinylene carbonate, propylene sulfite, propene sultone, propane sultone or the like, but the present invention is not limited thereto.

The non-aqueous electrolyte solution is injected into an electrode structure constituting of a cathode, an anode and a separator interposed between the cathode and the anode to prepare a lithium secondary battery. An exterior of the lithium secondary battery of the present invention is not particularly limited, and the lithium secondary battery may be formed in a cylindrical form using a can, a polygonal form, a pouch type, a coin type, etc.

Hereinafter, the present invention will be described in detail in conjunction with examples.

Example 1

Cathode

A lithium-metal oxide (hereinafter referred to as "CAM1") in which an entire composition is $LiNi_{0.80}Co_{0.10}Mn_{0.10}O_2$, a composition of a central portion is $LiNi_{0.83}Co_{0.10}Mn_{0.07}O_2$, and a composition of a surface portion is $LiNi_{0.78}Co_{0.10}Mn_{0.12}O_2$, and which has a concentration gradient region of nickel and manganese at an intermediate portion between the central portion and the surface portion, and is doped with Ti was used as a cathode active material, Denka Black was used as a conductive material, and PVDF was used as a binder. A cathode slurry was prepared using the lithium-metal oxide, Denka Black and PVDF in a weight ratio of 92:5:3, and a cathode was prepared by applying the slurry on an aluminum substrate, drying and pressing it.

Note that, a concentration gradient of the used lithium-metal oxide is as shown in the following Table 1, and a position to measure a concentration is as illustrated in FIG. 1. Regarding the measurement position, the measurement was performed at intervals of 0.4 μm from the center of a lithium-metal oxide particle having a distance of 4.8 μm from the center to the surface thereof.

Figure 2:
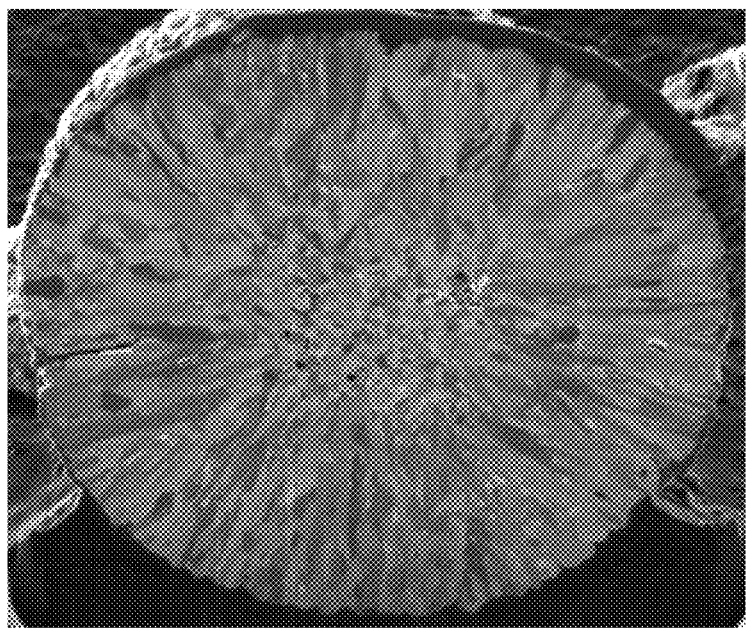
FIG. 2 is an SEM image of the cross section of a cathode active material of Example 1.

An SEM image of the cross section of the cathode active material of Example 1 is as shown in FIG. 2.

TABLE 1

| Position | Ni | Co | Mn |
| --- | --- | --- | --- |
| 1 | 0.830 | 0.100 | 0.070 |
| 2 | 0.831 | 0.101 | 0.068 |
| 3 | 0.829 | 0.100 | 0.071 |
| 4 | 0.830 | 0.100 | 0.070 |
| 5 | 0.800 | 0.099 | 0.101 |
| 6 | 0.780 | 0.100 | 0.120 |
| 7 | 0.780 | 0.100 | 0.120 |
| 8 | 0.780 | 0.101 | 0.119 |
| 9 | 0.781 | 0.100 | 0.119 |
| 10 | 0.779 | 0.101 | 0.120 |
| 11 | 0.780 | 0.100 | 0.120 |
| 12 | 0.781 | 0.099 | 0.120 |
| 13 | 0.780 | 0.100 | 0.120 |

Anode

An anode was prepared by applying an anode slurry including natural graphite (d002 3.358 Å) as an anode active material at 93 wt %, KS6 which is a flake type conductive material as a conductive material at 5 wt %, SBR as a binder at 1 wt %, and CMC as a thickener at 1 wt % on a copper substrate, drying and pressing it.

Batteries

A cathode electrode plate and an anode electrode plate each were notched to a suitable size and stacked, a separator (polyethylene, thickness: 25 μm) was interposed between the cathode electrode plate and anode electrode plate to form a battery, and a tab portion of the cathode and a tab portion of the anode each were welded. A welded cathode/separator/anode assembly was put into a pouch, and three surfaces except for an electrolyte injection portion surface were sealed. Here, a sealed portion includes a tab portion. A remaining portion was injected with an electrolyte solution and sealed, and the assembly was impregnated for 12 hours. As the electrolyte solution, an electrolyte solution obtained by preparing a 1M $LiPF_6$ solution using a mixed solution of EC/EMC/DEC (25/45/30; volume ratio), and adding vinylene carbonate (VC) at 1 wt %, 1,3-propene sultone (PRS) at 0.5 wt % and lithium bis(oxalato)borate (LiBOB) at 0.5 wt % thereto.

Thereafter, pre-charging was performed using a current (2.5 A) corresponding to 0.25 C for 36 minutes. Degassing was conducted after 1 hour, aging was performed for 24 hours, and initial charging and discharging were carried out (charging conditions: CC-CV 0.2 C 4.2V 0.05 C CUT-OFF, discharging conditions: CC 0.2 C 2.5V CUT-OFF). Then, standard charging and discharging were performed (charging conditions: CC-CV 0.5 C 4.2V 0.05 C CUT-OFF, discharging conditions: CC 0.5 C 2.5V CUT-OFF).

Examples 2 to 30

Batteries were prepared in the same manner as in Example 1 except that the type and concentration of the transition metal for doping the cathode active material were changed.

The types and concentrations of the transition metal were described in the following Table 3.

Example 31 to 40

Batteries were prepared in the same manner as in Example 1 except that a lithium-metal oxide (hereinafter referred to as "CAM2") in which an entire composition is $LiNi_{0.80}Co_{0.11}Mn_{0.09}O_2$, a composition of a central portion is $LiNi_{0.8}Co_{0.11}Mn_{0.088}O_2$, and a composition of a surface portion is $LiNi_{0.77}Co_{0.11}Mn_{0.12}O_2$, and which has a concentration gradient region of nickel and manganese at an intermediate portion between the central portion and the surface portion, and is doped with a transition metal was used as a cathode active material.

Note that, a concentration gradient of the used lithium-metal oxide is as shown in the following Table 2, and a position to measure a concentration is as illustrated in FIG. 1. Regarding the measurement position, the measurement was performed at intervals of 0.4 μm from the center of a lithium-metal oxide particle having a distance of 4.8 μm from the center to the surface thereof.

Figure 3:
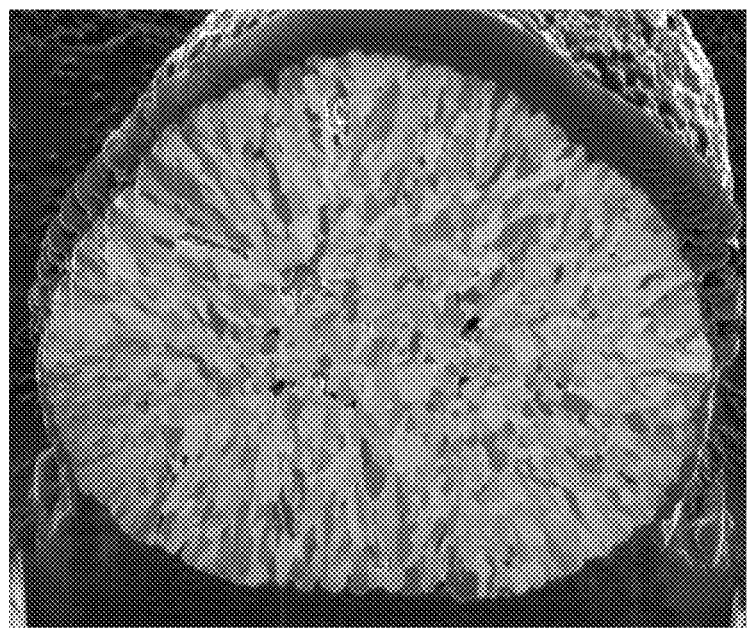
FIG. 3 is an SEM image of the cross section of a cathode active material of Example 31.

An SEM image of the cross section of the cathode active material of Example 31 is as shown in FIG. 3.

TABLE 2

| Position | Ni | Co | Mn |
| --- | --- | --- | --- |
| 1 | 0.802 | 0.110 | 0.088 |
| 2 | 0.801 | 0.111 | 0.088 |
| 3 | 0.802 | 0.110 | 0.088 |
| 4 | 0.802 | 0.110 | 0.088 |
| 5 | 0.803 | 0.111 | 0.086 |
| 6 | 0.802 | 0.110 | 0.088 |
| 7 | 0.802 | 0.110 | 0.088 |
| 8 | 0.802 | 0.109 | 0.089 |
| 9 | 0.801 | 0.110 | 0.089 |
| 10 | 0.802 | 0.110 | 0.088 |
| 11 | 0.802 | 0.108 | 0.090 |
| 12 | 0.800 | 0.110 | 0.090 |
| 13 | 0.770 | 0.110 | 0.120 |

Comparative Example 1

A battery was prepared in the same manner as in Example 1 except that $LiNi_{0.8}Co_{0.1}Mn_{0.1}O_2$ (hereinafter referred to as "NCM811") which is not doped with a transition metal was used as a lithium-metal oxide of a cathode active material.

Figure 4:
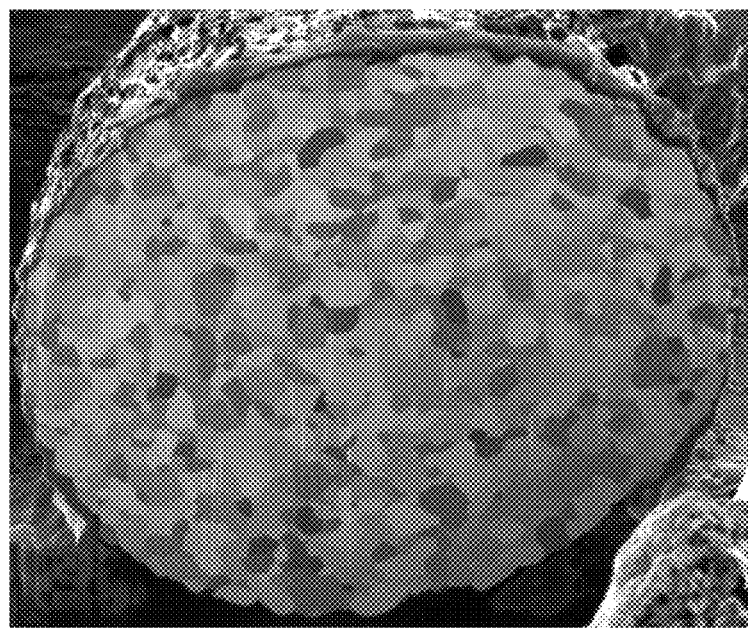
FIG. 4 is an SEM image of the cross section of a cathode active material of Comparative Example 1.

An SEM image of the cross section of a cathode active material of Comparative Example 1 is as shown in FIG. 4.

Comparative Examples 2 to 6

Batteries were prepared in the same manner as in Comparative Example 1 except that a transition metal was used as a dopant. The types and concentrations of the transition metal were described the following Table 3.

Comparative Example 7

A battery was prepared in the same manner as in Example 1 except that doping with a transition metal was not performed.

Comparative Example 8

A battery was prepared in the same manner as in Example 31 except that doping with a transition metal was not performed.

Experimental Example

1. Measurement of Low-Temperature Properties (Capacity at −20° C. as Compared to Capacity at Room Temperature)

Low temperature properties were measured by comparison of a 0.5 C discharge capacity and a 0.5 C charge capacity at −20° C. with those at room temperature (25° C.) using batteries prepared according to the examples and comparative examples, and the results were described in the following Table 3.

2. Low Temperature Output Properties (Output at −20° C. as Compared to Room Temperature)

Output properties were measured at −20° C. through a hybrid pulse power characterization (HPPC) test of the FreedomCAR Battery Test Manual using batteries prepared according to examples and comparative examples, and the results were described in the following Table 3.

TABLE 3

| Classification | Cathode active material | Doping material | Doping concentration (ppm) | −20° C. charge capacity (%) | −20° C. discharge capacity (%) | −20° C. discharge output (%) |
|---|---|---|---|---|---|---|
| Comparative Example 1 | NCM811 | — | — | 62 | 73 | 17 |
| Comparative Example 2 | NCM811 | Ti | 500 | 62 | 74 | 17 |
| Comparative Example 3 | NCM811 | Ti | 1000 | 63 | 74 | 18 |
| Comparative Example 4 | NCM811 | Ti | 3000 | 63 | 75 | 19 |
| Comparative Example 5 | NCM811 | Ti | 5000 | 62 | 74 | 18 |
| Comparative Example 6 | NCM811 | Ti | 7000 | 62 | 73 | 18 |
| Comparative Example 7 | CAM1 | — | — | 62 | 72 | 17 |
| Example 1 | CAM1 | Ti | 500 | 64 | 75 | 19 |
| Example 2 | CAM1 | Ti | 1000 | 65 | 79 | 21 |
| Example 3 | CAM1 | Ti | 3000 | 66 | 80 | 23 |
| Example 4 | CAM1 | Ti | 5000 | 65 | 78 | 20 |
| Example 5 | CAM1 | Ti | 7000 | 62 | 75 | 18 |
| Example 6 | CAM1 | Zr | 500 | 64 | 74 | 19 |
| Example 7 | CAM1 | Zr | 1000 | 65.5 | 79 | 20.5 |
| Example 8 | CAM1 | Zr | 3000 | 67 | 80 | 24 |
| Example 9 | CAM1 | Zr | 5000 | 66 | 78.5 | 21.5 |
| Example 10 | CAM1 | Zr | 7000 | 63 | 76 | 19 |
| Example 11 | CAM1 | Mg | 500 | 62 | 74 | 18 |
| Example 12 | CAM1 | Mg | 1000 | 64 | 77 | 19 |
| Example 13 | CAM1 | Mg | 3000 | 65 | 79 | 22 |
| Example 14 | CAM1 | Mg | 5000 | 64.5 | 78 | 21 |
| Example 15 | CAM1 | Mg | 7000 | 62 | 75 | 18 |
| Example 16 | CAM1 | Al | 500 | 64 | 75 | 19 |
| Example 17 | CAM1 | Al | 1000 | 66 | 79 | 20 |
| Example 18 | CAM1 | Al | 3000 | 68 | 80 | 22 |
| Example 19 | CAM1 | Al | 5000 | 66.5 | 79 | 21 |
| Example 20 | CAM1 | Al | 7000 | 64 | 77 | 19 |
| Example 21 | CAM1 | Ti + Zr | 500 | 63 | 75 | 19 |
| Example 22 | CAM1 | Ti + Zr | 1000 | 65.5 | 79 | 23 |
| Example 23 | CAM1 | Ti + Zr | 3000 | 68 | 82 | 26 |
| Example 24 | CAM1 | Ti + Zr | 5000 | 65 | 79 | 23 |
| Example 25 | CAM1 | Ti + Zr | 7000 | 63 | 75 | 19 |
| Example 26 | CAM1 | Ti + Al | 500 | 63 | 74 | 19 |
| Example 27 | CAM1 | Ti + Al | 1000 | 68 | 79 | 21 |
| Example 28 | CAM1 | Ti + Al | 3000 | 69 | 82 | 25 |
| Example 29 | CAM1 | Ti + Al | 5000 | 67 | 79 | 22 |
| Example 30 | CAM1 | Ti + Al | 7000 | 63 | 76 | 20 |
| Comparative Example 8 | CAM2 | — | — | 61.5 | 72 | 17 |
| Example 31 | CAM2 | Ti | 500 | 63.5 | 74 | 19 |
| Example 32 | CAM2 | Ti | 1000 | 65 | 79 | 20.5 |
| Example 33 | CAM2 | Ti | 3000 | 67 | 81 | 24 |

TABLE 3-continued

| Classification | Cathode active material | Doping material | Doping concentration (ppm) | −20° C. charge capacity (%) | −20° C. discharge capacity (%) | −20° C. discharge output (%) |
|---|---|---|---|---|---|---|
| Example 34 | CAM2 | Ti | 5000 | 65 | 78 | 22 |
| Example 35 | CAM2 | Ti | 7000 | 62 | 75 | 18 |
| Example 36 | CAM2 | Ti + Zr | 500 | 63 | 77 | 20 |
| Example 37 | CAM2 | Ti + Zr | 1000 | 66 | 80 | 24 |
| Example 38 | CAM2 | Ti + Zr | 3000 | 69 | 83 | 27 |
| Example 39 | CAM2 | Ti + Zr | 5000 | 66 | 81 | 25 |
| Example 40 | CAM2 | Ti + Zr | 7000 | 63 | 76 | 20 |

Referring to Table 3, it may be determined that batteries of the examples show significantly excellent low-temperature properties as compared to those of the comparative examples.

More specifically, referring to Comparative Examples 1 to 6, it may be determined that a charge capacity was increased to the maximum of 1%, a discharge capacity was increased to the maximum of 2%, and a discharge output was increased to the maximum of 2% by doping with a transition metal.

However, when comparing Comparative Example 7 and Examples 1 to 5, it may be determined that a charge capacity was increased to the maximum of 4%, a discharge capacity was increased to the maximum of 8%, and a discharge output was increased to the maximum of 6% as compared to room temperature by doping with the same transition metal, and thus the degree of improvement by a combination of CAM1 and a transition metal was high.

Further, when comparing Comparative Examples 1 to 6, Comparative Example 8 and Examples 31 to 35, it may be determined that low-temperature properties were highly improved in the case of CAM2 with a different concentration gradient as well as CAM1.

It may be determined that the degree of improvement of low-temperature properties according to a doping amount of a transition metal increased from 500 to 3,000 ppm, was most excellent at 3,000 ppm, and decreased in a range of 3,000 ppm or more to 7,000 ppm or less. Moreover, batteries prepared using CAM1 doped with a transition metal such as Zr, Mg, Al or the like in addition to Ti also exhibited excellent low-temperature properties.

Referring to Examples 21 to 30 and Examples 36 to 40, excellent low-temperature properties were shown in batteries in which doping with two or more types of the transition metal were performed as well as in batteries in which doping with one type of the transition metal was performed, as compared to batteries in which doping with the transition metal was not performed.

The lithium secondary battery of the present invention has a continuous concentration gradient and includes a cathode active material including a lithium-metal oxide doped with a transition metal, and thus can have the effect of significantly improving low-temperature properties. More specifically, the charge/discharge capacity and output at a low temperature are notably increased, and thereby excellent properties can be obtained even in the low-temperature environment.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:
1. A lithium secondary battery, comprising:
a cathode;
an anode; and
a non-aqueous electrolyte solution,
wherein the cathode includes a cathode active material including a lithium-metal oxide which is doped with a dopant element,
wherein the lithium-metal oxide is represented by Formula 1 below,

$$Li_xM1_aM2_bM3_cO_y$$ <span style="float:right">Formula 1</span> wherein M1, M2 and M3 are selected from a group consisting of Ni, Co, Mn, Na, Mg, Ca, Ti, V, Cr, Cu, Zn, Ge, Sr, Ag, Ba, Zr, Nb, Mo, Al, Ga and B,
$0<x\leq1.1$, $2\leq y\leq2.02$, $0<a<1$, $0<b<1$, $0<c<1$, and $0<a+b+c\leq1$,
wherein the cathode active material comprises
a central portion within 0.1 μm to 0.2 μm radius from a center of the cathode active material;
a surface portion within 0.1 μm but not less than 0.05 μm from an outmost portion of the cathode active material; and
an intermediate region between the central portion and the surface portion, the intermediate region comprising a concentration gradient region wherein M1 and M3 have a concentration gradient in a direction from the central portion to the surface portion, and a non-concentration gradient region wherein M1 and M3 do not have a concentration gradient in a direction from the central portion to the surface portion; and
wherein M2 has a constant concentration throughout the cathode active material from the central portion to the surface portion.
2. The lithium secondary battery of claim 1, wherein the concentration of M3 is increased within the concentration gradient region in the direction from the central portion to the surface portion, and the concentration of M1 is decreased within the concentration gradient region in the direction from the central portion to the surface portion.
3. The lithium secondary battery of claim 1, wherein the concentrations of M3 and M1 are constant within the central portion and the surface portion.
4. The lithium secondary battery of claim 1, wherein the M1, M2 and M3 are Ni, Co and Mn, respectively.
5. The lithium secondary battery of claim 1, wherein the non-concentration gradient region comprises a first non-concentration gradient region between the central portion and the concentration gradient region and a second non-concentration gradient region between the concentration gradient region and, the surface portion.

6. The lithium secondary battery of claim 1, wherein a concentration of the dopant element ranges from 1,000 to 5,000 ppm.

7. The lithium secondary battery of claim 1, wherein the concentration of M3 at the central portion and the concentration of M3 at the surface portion are different from each other, and
 the concentration of M1 at the central portion and the concentration of M1 at the surface portion are different from each other.

8. The lithium secondary battery of claim 1, wherein the dopant element is one or more selected from the group consisting of Ti, Zr, Mg, Al, V, B, Na, Ca, Cr, Cu, Zn, Ge, Sr, Ba, Nb and Ga.

9. The lithium secondary battery of claim 1, wherein the M1 is Ni, and $0.6 \leq a \leq 0.95$ and $0.05 \leq b+c \leq 0.4$.

10. The lithium secondary battery of claim 1, wherein the M1 is Ni, and $0.7 \leq a \leq 0.9$ and $0.1 \leq b+c \leq 0.3$.

11. The lithium secondary battery of claim 1, wherein primary particles including the lithium-metal oxide are rod-type particles.

12. The lithium secondary battery of claim 1, wherein the surface portion has a width of 0.1 μm from an outmost portion of the cathode active material.

* * * * *